(12) United States Patent
Dadual et al.

(10) Patent No.: US 11,281,616 B2
(45) Date of Patent: Mar. 22, 2022

(54) PROGRAMMABLE DATA BUS INVERSION AND CONFIGURABLE IMPLEMENTATION

(71) Applicant: Intel Corporation, Santa Clara, CA (US)

(72) Inventors: Melin Dadual, Beaverton, OR (US); Vivek Joy Kozhikkottu, Hillsboro, OR (US); Shankar Ganesh Ramasubramanian, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 16/663,134

(22) Filed: Oct. 24, 2019

(65) Prior Publication Data

US 2020/0285599 A1    Sep. 10, 2020

(51) Int. Cl.
| | |
|---|---|
| *G06F 3/00* | (2006.01) |
| *G06F 13/40* | (2006.01) |
| *G06F 13/374* | (2006.01) |
| *G06F 1/3234* | (2019.01) |
| *G06F 1/26* | (2006.01) |
| *G06F 13/42* | (2006.01) |

(52) U.S. Cl.
CPC ......... *G06F 13/4072* (2013.01); *G06F 1/263* (2013.01); *G06F 1/3253* (2013.01); *G06F 13/374* (2013.01); *G06F 13/4234* (2013.01)

(58) Field of Classification Search
CPC ................................................... G06F 13/4072
USPC ........................................................... 710/305
See application file for complete search history.

(56) References Cited

U.S. PATENT DOCUMENTS

| | | | | |
|---|---|---|---|---|
| 5,625,539 | A * | 4/1997 | Nakata | H02M 7/4807 363/132 |
| 2007/0147097 | A1* | 6/2007 | Huang | H02M 1/32 363/55 |
| 2012/0221183 | A1* | 8/2012 | Wu | B60L 15/20 701/22 |
| 2013/0061006 | A1* | 3/2013 | Hein | G11C 7/1087 711/154 |
| 2014/0289440 | A1* | 9/2014 | Shu | G06F 13/4282 710/307 |

* cited by examiner

*Primary Examiner* — Titus Wong
(74) *Attorney, Agent, or Firm* — Schwabe, Williamson & Wyatt, P.C.

(57) ABSTRACT

A device includes a driver circuit to send data bits onto a data bus that is partitioned into a DC component and an AC component. The driver circuit is to, for some data bits, retrieve a value of a DC power ratio of the data bus. The driver circuit is further to determine, using the value of the DC power ratio, a first value for a first portion of total power to be dissipated over the DC component to transmit the data bits, and determine, using one minus the value of the DC power ratio, a second value for a second portion of total power to be dissipated over the AC component to transmit the data bits. The driver circuit is to determine whether to send the data bits onto the data bus using data bus inversion dependent on a combination of the first value and the second value.

20 Claims, 11 Drawing Sheets

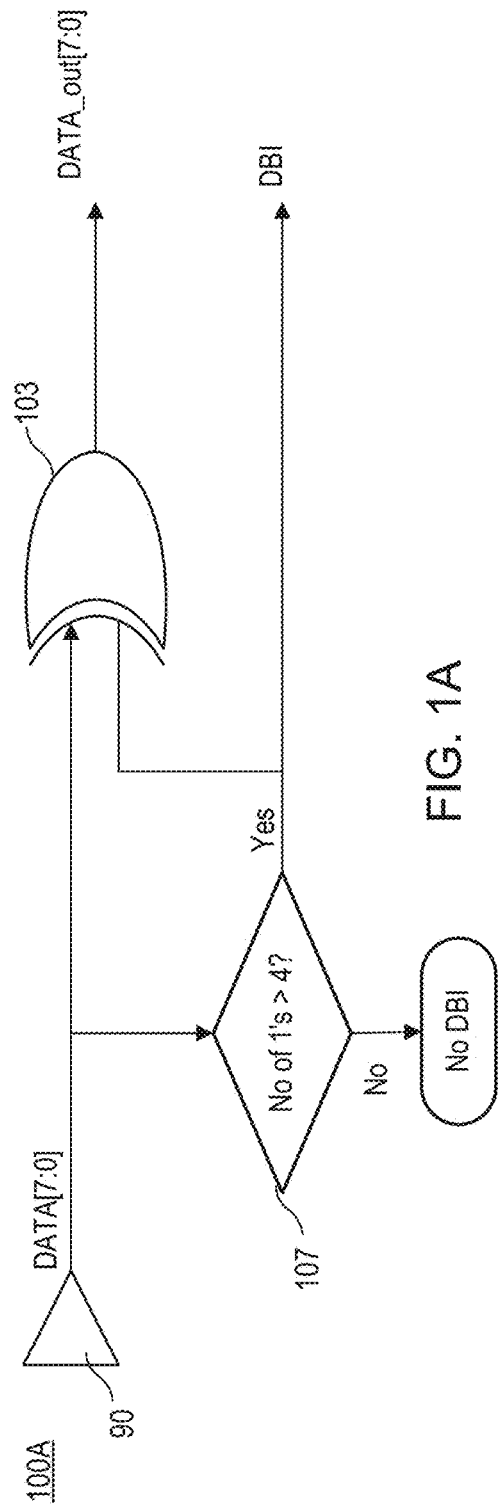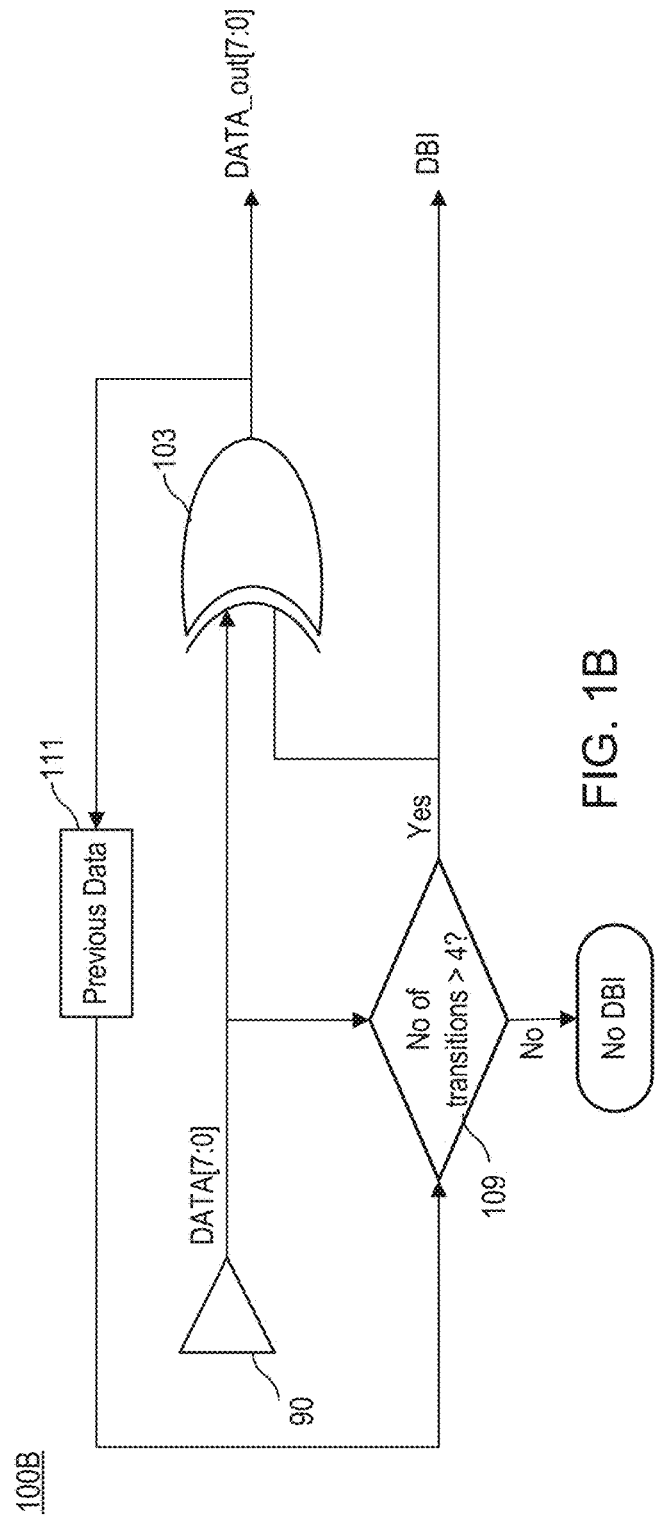
FIG. 1A
FIG. 1B

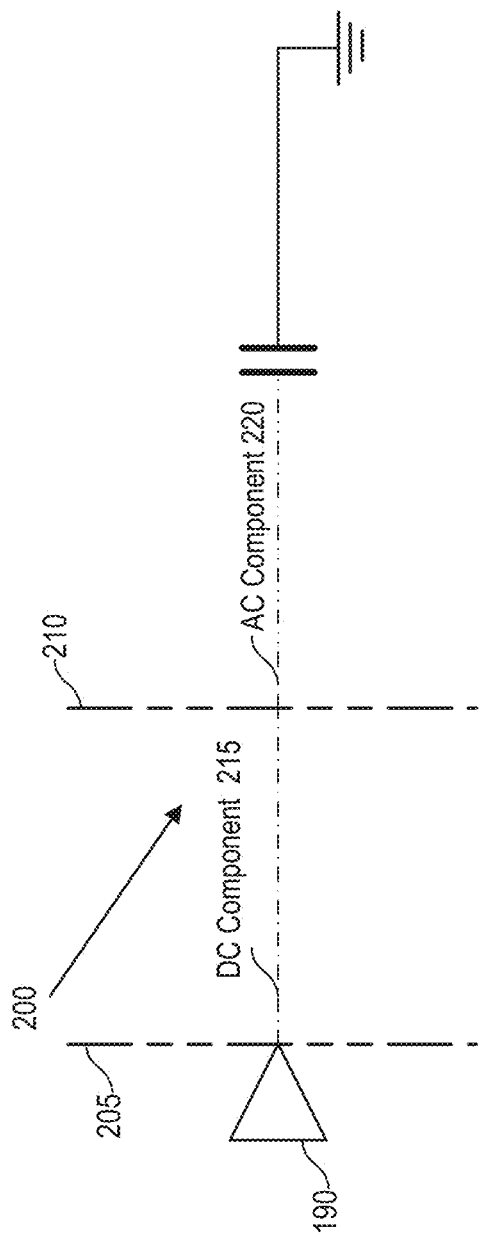

PROGRAMMABLE DATA BUS INVERSION AND CONFIGURABLE IMPLEMENTATION

BRIEF DESCRIPTION OF THE DRAWINGS

FIG. 1A is a simplified schematic diagram of a driver circuit for determining whether to use data bus inversion (DBI) on a direct-current (DC) bus according to an embodiment.

FIG. 1B is a simplified schematic diagram of a driver circuit for determining whether to use DBI on an alternating-current (AC) bus according to an embodiment.

FIG. 2 is a simplified block diagram illustrating a hybrid data bus according to an embodiment.

DESCRIPTION OF EMBODIMENTS

Figure 3A:
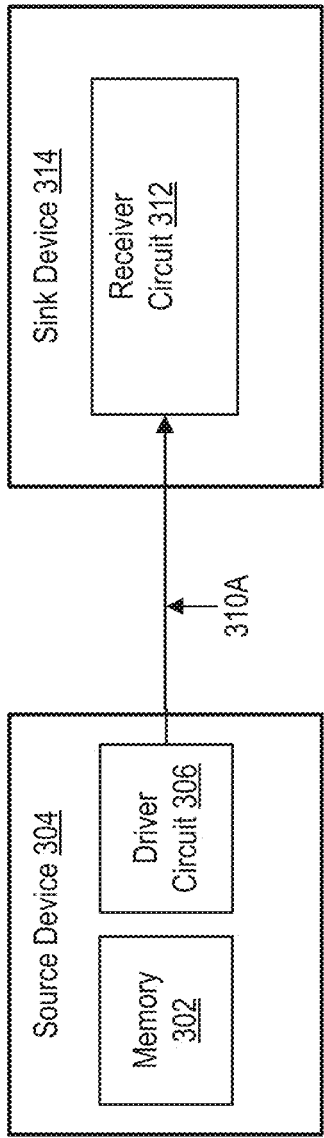
FIG. 3A is a block diagram of a system having a source device coupled to a sink device by a hybrid data bus according to an embodiment.

Data Bus Inversion (DBI) is a technique employed to reduce power dissipated on a bus, with particular focus on data buses. There are two approaches to perform DBI on a bus, namely with use of direct-current (DC) DBI or alternating-current (AC) DBI. While DC DBI is used on DC busses where the major power dissipation occurs when a driver is transmitting a one value ("1") on the bus, AC DBI is used on AC busses where the major power dissipation occurs when there is a data bit transition on the bus, e.g., a zero value changes to a one value or a one value changes to a zero value. Modern computing platforms, however, have several buses that behave as a DC bus for a portion of the channel and as an AC bus for the remaining portion of the channel. The Double Data Rate (DDR) data bus is a popular example, where a portion of the data bus routed on a board (e.g., printed circuit board) behaves as a DC bus, and a portion of the data bus that travels through the DDR memory device behaves like an AC bus. In such scenarios, applying AC DBI or DC DBI alone would be suboptimal from a power optimization perspective, as doing so would ignore the possible power demand of ones (for the DC bus) or data bit transitions (for the AC bus) depending on which type of bus strategy is employed.

In various embodiments, to address this deficiency, the disclosed system may be intelligently adapted with a driver circuit that can decide whether to implement DBI for any particular group of data bits, e.g., within a stream of data bits being transmitted to a sink device. The decision may select the most energy-efficient manner for transmitting the data across a hybrid data bus, whether it is with or without DBI. More specifically, if the overall power dissipation of the channel (which is the sum of expected DC and AC power dissipations) is lower when the data is inverted, the circuit performs DBI when sending the data bits.

For example, in one embodiment, the driver circuit may send data bits onto a data bus that is partitioned into a DC component and an AC component. The driver circuit may, for a group of data bits, retrieve a value of a DC power ratio of the data bus, which may be a programmed discrete quantized value in one embodiment. The DC power ratio may indicate a ratio (or percentage) of the data bus that is composed of the DC component. The driver circuit may further determine, using the value of the DC power ratio, a first value for a first portion of total power to be dissipated over the DC component to transmit the group of data bits. The driver circuit may further determine, using one minus the value of the DC power ratio, a second value for a second portion of total power to be dissipated over the AC component to transmit the group of data bits. The driver circuit may further determine whether to send the group of data bits onto the data bus using DBI dependent on a combination of the first value and the second value. For example, if inverting the data in both the DC and AC components would dissipate less power than not inverting the data, then DBI is used when sending the data bits.

Implementation of such a driver circuit includes a number of advantages, including that the power saving on busses will significantly increase in present systems or packages that include multiple dies within a single package. Sending data across busses that go on and off the package and are thus complex in their hybrid DC/AC nature will save significant power at the package level, particularly in modern high-speed busses. Saving power also means running cooler and the concomitant savings in cooling requirements.

FIG. 1A is a simplified schematic diagram of a driver circuit 100A for determining whether to use data bus inversion (DBI) on a DC bus according to an embodiment. The driver circuit 100A may include a driver 90 to drive data bits (e.g., a group of eight bits of data, although additional or fewer bits are envisioned) onto the DC bus and driver logic (or code) to determine whether to use the DBI on the DC bus.

In one embodiment, the driver logic includes an inverter gate 103 (e.g., an exclusive or (XOR) gate) and a comparator 107 (or the like). The data bits from the driver may be analyzed by the comparator 107, and if more than fifty percent (e.g., four in this case) of the data bits are a one value ("1"), the comparator 107 outputs a DBI bit. The DBI bit may be combined with the data bits by the inverter gate 103, which outputs an inverted version of the data bits to be sent onto the DC bus. The DBI bit may be duplexed onto the DC bus or sent over a separate wire or channel in parallel with the data bits (e.g., the inverted bits) to indicate that this particular group of data bits was inverted.

In contrast, if the number of data bits in the group of data bits that have a one value are less than or equal to fifty percent of the bus width (e.g., four in this case), then the data bits are sent without inversion. Accordingly, the comparator 107 will output a zero value and the data bits are driven onto the DC bus without use of DBI.

FIG. 1B is a simplified schematic diagram of a driver circuit 100B for determining whether to use DBI on an AC bus according to an embodiment. The driver circuit 100A may also include the driver 90 to drive data bits onto the AC bus and driver logic (or code) to determine whether to use the DBI on the AC bus.

In one embodiment, the driver logic includes the inverter gate 103, a latch 111 to hold previous data bits, and a comparator 109 adapted to compare each data bit with each previous data bit (stored in the latch 111) to determine how many transitions exist in a group of data bits to be sent onto the AC bus. Transitions include, in consecutive data bits, a zero value changing to a one value or a one value changing to a zero value. If the number of transitions within the group of data bits is greater than fifty percent of the data bits, the comparator 109 outputs a DBI bit. As before, the DBI bit will cause each data bit of the group of data bits to be inverted and the DBI bit is sent along with or in parallel with the group of data bits to indicate the data bits were inverted.

In contrast, if the number of transitions between data bits of the group of data bits is less than or equal to fifty percent of the data bits, then the data bits are sent without inversion. Accordingly, the comparator 107 will output a zero value and the data bits are driven onto the DC bus without use of DBI.

FIG. 2 is a simplified block diagram illustrating a hybrid data bus 200 according to an embodiment. The hybrid data bus 200 may be a complex high speed bus coupled to memory, such as a DDR bus, inter-die fabrics, or buses within a system-on-a-chip (SoC), such as connecting to a register file or cache, or the like. A driver 190 may exist on a first chip or other first device and be adapted to drive groups of data bits onto the hybrid data bus 200. The hybrid data bus 200 may include a DC component 215 that is positioned between a first device boundary 205 and a second device boundary 210, e.g., running on a PCB of a packaged device. The hybrid data bus 200 may further include an AC component 220 that exists on a second chip or other second device that may be modeled as a capacitor with a certain amount of capacitance. While the hybrid data bus 200 is illustrated in a simplified form, it should be understood that the hybrid data bus may include more than one DC component 215 (e.g., may have more than one lead or wire on the PCB or other connector board) and/or more than one AC component 220 (e.g., may have more than one lead or wire on separate chips or systems-on-a-chip).

FIG. 3A is a block diagram of a system 300A having a source device 304 coupled to a sink device 314 by a hybrid data bus 310A according to an embodiment. The hybrid data bus 310A may be modeled like the hybrid data bus 200 of FIG. 2. The system 300A may further include a sink device 314 having a receiver circuit 312 to receive data bits sent over the hybrid data bus 200. The driver circuit 306 may be adapted with a driver and other logic (or code) for determining whether to send a group of data bits onto the hybrid data bus 310A using DBI.

The source device 304 may include a driver circuit 306 and a memory 302, such as local memory, a static random access memory (SRAM) chip, a register, flash memory, other cache-like memory, or by main memory such as dynamic random access memory (DRAM) or the like. The memory 302 may be adapted to store the value for the DC power ratio when programmed by a basic input/output system (BIOS), e.g., during power management programming, or during other system programming. The driver circuit 306 may retrieve the value of the DC power ratio of the hybrid data bus 310A out of the memory 302 when determining whether to send a particular group of data bits using DBI over the hybrid data bus 310A.

Figure 3B:
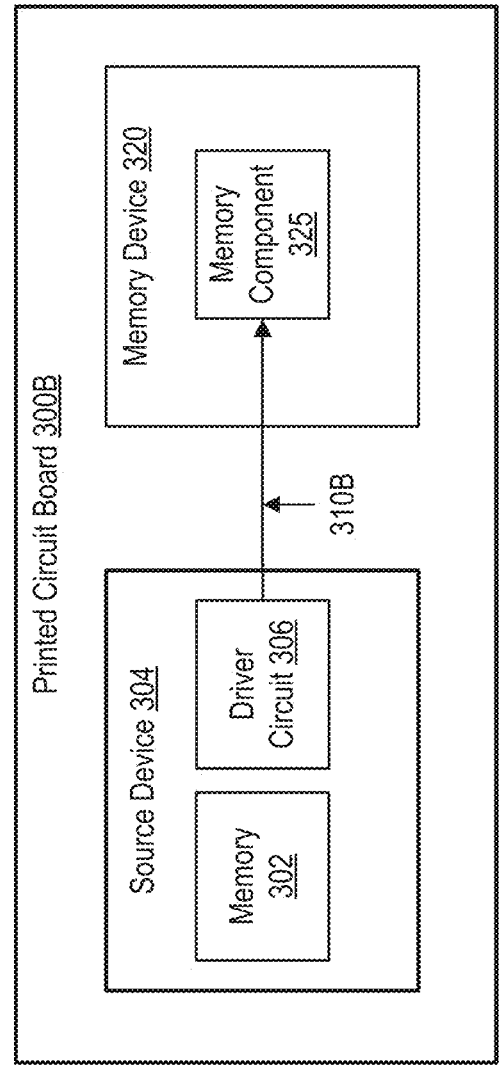
FIG. 3B is a block diagram of a printed circuit board (PCB) in which the source device is coupled to a memory device via a hybrid data bus according to an embodiment.

FIG. 3B is a block diagram of a printed circuit board (PCB) 330B in which the source device 304 (such as in FIG. 3A) is coupled to a memory device 320 via a hybrid data bus 310B according to an embodiment. The memory device 320 may be a double data rate (DDR) memory device, or a memory device based on other protocol such as NAND flash, 3D crosspoint (X point), or phase change memory (PCM), for example. The memory device 320 may include one or more memory component 325, e.g., an integrated chip-based memory component adapted to serve as memory at least for the source device 304 disposed on the PCB 300B. In the embodiment of FIG. 3B, the hybrid data bus 310B includes at least one DC component on the PCB 300B between the source device 304 and the memory device 320, and at least one AC component on the memory device 320 before entering the memory component 325.

Figure 4A:
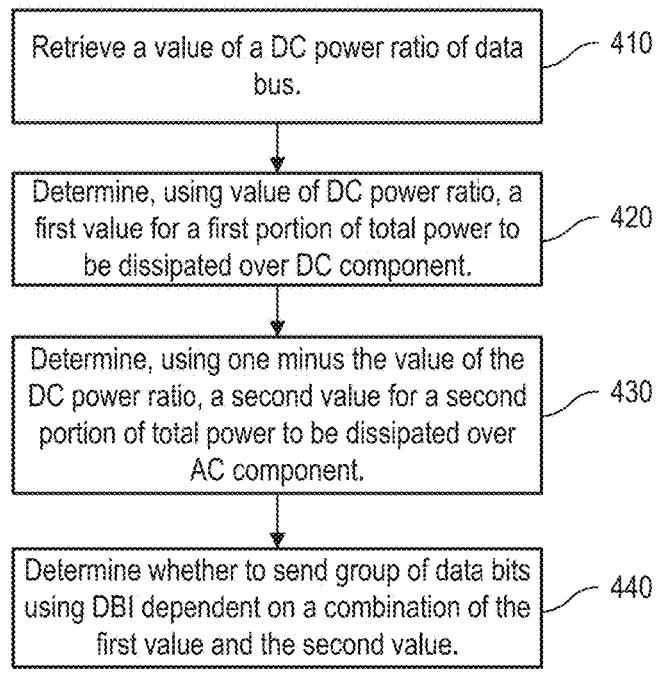
FIG. 4A is a flow chart of a method of determining whether to use DBI according to an embodiment.

FIG. 4A is a flow chart of a method 400 of determining whether to use DBI according to an embodiment. The method 400 may be performed by processing logic that may include hardware (e.g., circuitry, dedicated logic, and/or programmable logic), software (e.g., instructions executable on a computer system such as code), or a combination thereof. In an illustrative example, the method 400 may be performed by the driver circuit 306 of either FIG. 3A or FIG. 3B. The method 400 may be explained in relation to a data bus that is partitioned into a DC component and an AC component as disclosed herein.

In various embodiments, the method 400 may begin by the processing logic retrieving a value of a DC power ratio of the data bus (410). As discussed, the processing logic may retrieve the DC power ratio value from the memory 302 of the source device 304. The method 400 may continue with the processing logic determining, using the value of the DC power ratio, a first value for a first portion of total power to be dissipated over the DC component to transmit a group of data bits (420). The fraction of total power to be dissipated by the DC component of the hybrid data bus may be expressed as:

$$DC\_Power = Pop(data) * dc\_pwr\_ratio.$$

Here, the function Pop (for population) counts the number of one values (1's) in the group of data bits.

With continued reference to FIG. 4A, the method 400 may continue with the processing logic determining, using one minus the value of the DC power ratio, a second value for a second portion of total power to be dissipated over the AC component to transmit the group of data bits (430). Accordingly, the fraction of the power to be dissipated by the AC component of the hybrid data bus can expressed as (1−dc_pwr_ratio) and the fraction of the total power to be dissipated by the AC component depends on the number of transitions occurring on the hybrid data bus when going from the previous value on the bus to the new value (as per FIG. 1B). The fraction of total power dissipated by the AC component of the hybrid data bus may be expressed as:

$$AC\_Power = Pop(new\_value \oplus last\_value) * (1 - dc\_pwr\_ratio).$$

Here, the processing logic may employ an XOR of the last value on the hybrid data bus with the new value on the hybrid data bus to get locations of the bits that are transitioning. The Pop may be the same function used before, but now that counts the number of number of transitions between the last value and the new value. The Pop value is multiplied by one minus the value for the DC power ratio, e.g., what remains of the ratio for the entire hybrid data bus after the DC component is removed.

The method 400 may continue with the processing logic determining whether to send the group of data bits onto the data bus using DBI dependent on a combination of the first value (e.g., DC_Power) and the second value (e.g., AC_Power) (440). One way this may be done is discussed in more detail with reference to FIG. 4B.

Figure 4B:
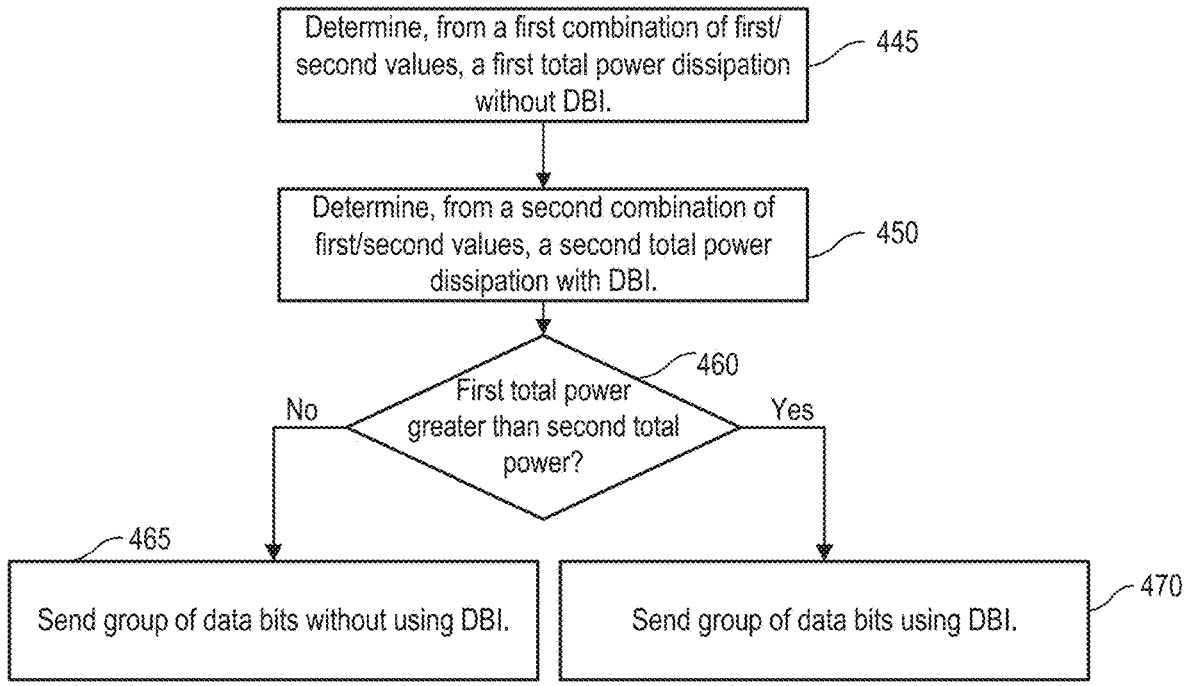
FIG. 4B is a flow chart of the method of determining whether to use DBI according to a further embodiment.

FIG. 4B is a flow chart of the method 400 of determining whether to use DBI according to a further embodiment. With continued reference to FIG. 4A, operation 440 may be explained in additional detail, e.g., to determine whether to send the group of data bits using DBI. To perform DBI on the hybrid data bus, the processing logic may calculate the total power to be dissipated from both DC and AC components on the hybrid data bus with and without DBI, and chose to perform DBI if DBI based energy is less than that of no DBI energy. More specifically, the method 400 may continue with the processing logic determining, from a first combination of the first value and the second value, a first total power to be dissipated without DBI (445). This first total power to be dissipated without DBI may be expressed as:

$$N0\_DBI\_Power = Pop(new\_value) * dc\_pwr\_ratio + Pop(new\_value \oplus last\_value) * (1 - dc\_pwr\_ratio).$$

Further, the method 400 may continue with the processing logic determining, from a second combination of the first value and the second value, a second total power to be dissipated with DBI (450). The second combination of the first value and the second value may be determined after inverting each new bit, e.g., making the assumption that DBI has been employed. In other words, the second combination may determine each of the first value and the second value, before combination, with an assumption that the group of data bits are inverted. This second total power to be dissipated with DBI may be expressed as:

$$DBI\_Power = Pop(\overline{new\_value}) * dc\_pwr\_ratio + Pop(\overline{new\_value} \oplus last\_value) * (1 - dc\_pwr\_ratio),$$

where the line over "new_value" indicates inversion.

With continued reference to FIG. 4B, the method 400 may continue with the processing logic determining whether the value of the first total power is greater than the value of the second total power (460). The method 400 may continue with the processing logic sending the group of data bits without using DBI in response to the value of first total power not being greater than the value of the second total power (465). Otherwise, the method 400 continues with the processing logic sending the group of data bits using DBI in response to the value of the first total power being greater than the value of the second total power (470). If DBI is employed for sending the group of data bits over the hybrid data bus, the processing logic asserts a DBI bit, which is sent along or in parallel with the group of data bits, to indicate to a receiver (or receiver circuit) that DBI was used when sending the group of data bits. In this way, the receiver (or receiver circuit) may reinvert each data bit of the group as part of receiving the group of data bits.

In various embodiments, the value for the DC power ratio (dc_pwr_ratio) is a variable across different systems as the power dissipated by each channel of each hybrid data bus may vary based on the channel length. The driver circuit 306 (FIGS. 3A and 3B) may be used on different types of computing platforms and thus the platform designer should be able to program a value of DC power ratio for a specific channel length for a specific platform. This inherent programmability may ensure that the disclosed embodiments are beneficial across a wide range of platforms.

Implementing the various functions described with reference to FIGS. 4A-4B in hardware with a floating point fractional value of the DC power ratio can impact circuit area and timing adversely depending on implementation. So, for hardware implementation purposes, the driver circuit 306 can implement the DC power ratio as a discrete quantized value of between two and four bits. For example, the DC power ratio may be programmed in hardware (and saved to the memory 302) as a 3-bit programmable value, which gives the user the use of eight different values of the DC power ratio for a specific channel of a hybrid data bus. Limiting the value of the DC power ratio to between two and four bits may seem like limiting the programmability for optimum power savings, but experimental data shows that increasing the programmability beyond a certain range of quantization level has limited utility and can adversely impact the latency and area overheads.

Figure 5:
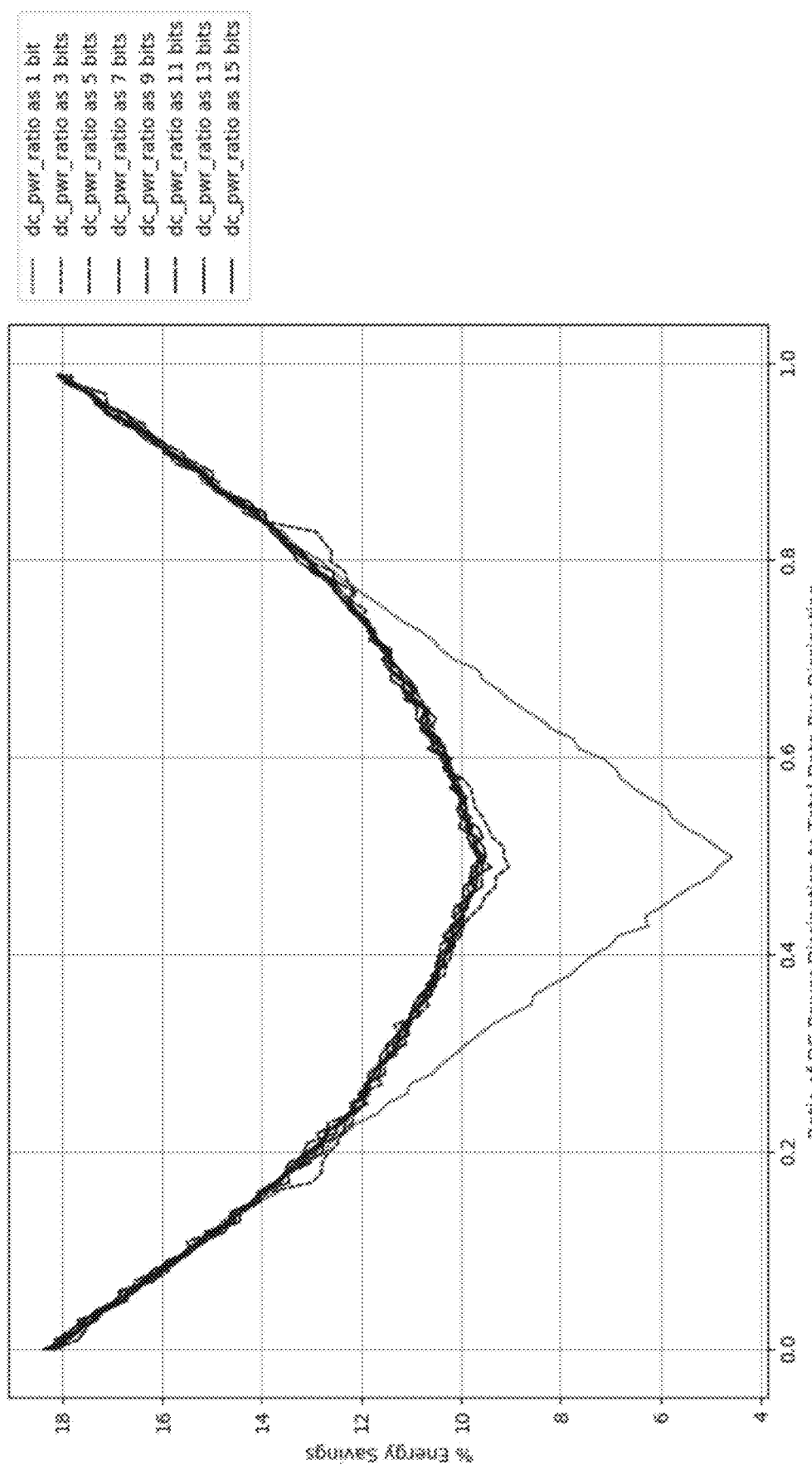
FIG. 5 is a graph illustrating the power savings for different levels of programmability for a DC power ratio according to various embodiments.

FIG. 5 is a graph illustrating the power savings for different levels of programmability for a DC power ratio according to various embodiments. FIG. 5 illustrates simulation-based data, where we measure the energy (e.g., power) saving achieved by applying the proposed DBI processing with varying levels of programmability of the DC power ratio (dc_pwr_ratio), e.g., 1 bit, 2 bits, 3 bits, etcetera, over different ratios of DC power dissipation to total channel (or data bus) power dissipation. There were 100,000 simulations performed with random input data vectors at each channel ratio point and the nearest values of the DC power ratio were chosen from those available. One can observe that from four-bit values for the DC power ratio and onwards the percentage savings does not deviate much from optimal. Thus having eight levels of DC power ratio (or in other words three bits of) programmability allows a designer to maximally capture all the potential energy/power savings.

Figure 6:
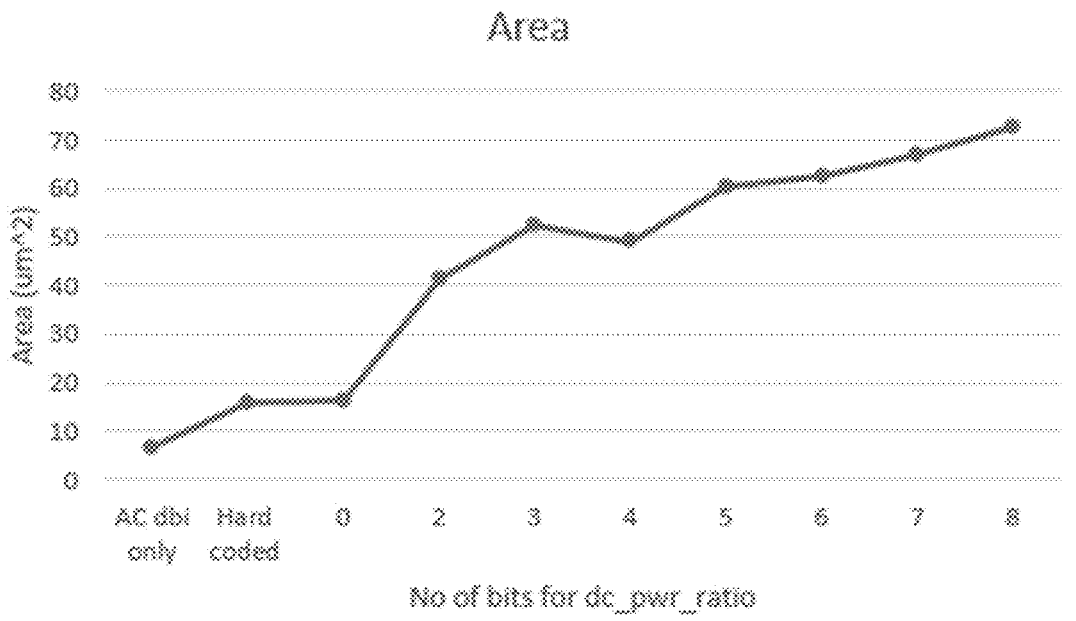
FIG. 6 is a graph illustrating the chip area required to implement programmability of the DC power ratio at particular granularities according to various embodiments.

To verify the area and timing impact of this code, we implemented the hardware in Verilog and present the area and timing numbers for different granularity of programmability of the DC power ratio based on synthesis data. FIG. 6 is a graph illustrating the chip area required to implement programmability logic of the DC power ratio at particular granularities according to various embodiments. The first two points (form left to right) show the area impact of AC-based DBI alone and the area impact of AC/DC-based DBI when using a hard coded value of the DC power ratio, respectively. We can observe here that as the programmability increases, e.g., the number of bits used to represent the DC power ratio increases, the area increases almost proportionally. And since, from FIG. 5, one can tell that there are not more energy/power savings to be gained by increasing the programmability after four bits dedicated to the DC power ratio, a designer can use two to four (e.g., three) bits to implement the DC power ratio to have a lower footprint.

Figure 7:
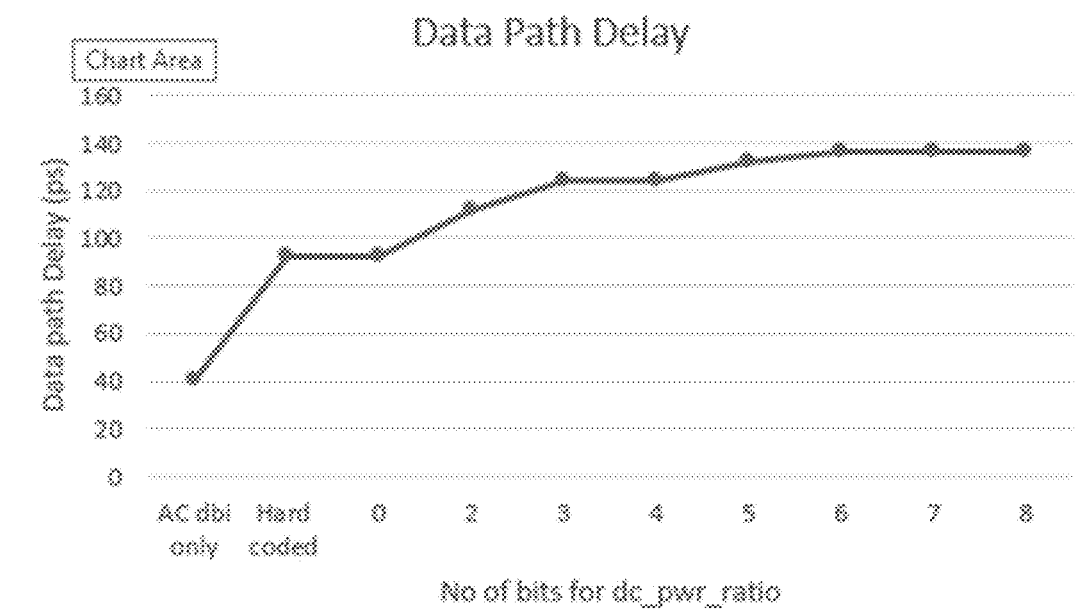
FIG. 7 is a graph illustrating the data path delay that results in implementing programmability of the DC power ratio at particular granularities, according to various embodiments.

FIG. 7 is a graph illustrating the data path delay that results in implementing programmability of the DC power ratio at particular granularities, according to various embodiments. In embodiments, FIG. 7 shows the variation of the latency of the logic with respect to programmability of the DC power ratio. Here, one can observe that as the programmability of DC power ratio increases, the latency of the data path also increases. One can see that DC power ratio values of two to four bits (e.g., three bits) is a good overall tradeoff between overall energy/power savings and associated latency and area overhead. System designers can also utilize the hard coded approach if the bus channel characteristics can be ascertained well during the design process.

Figure 8:
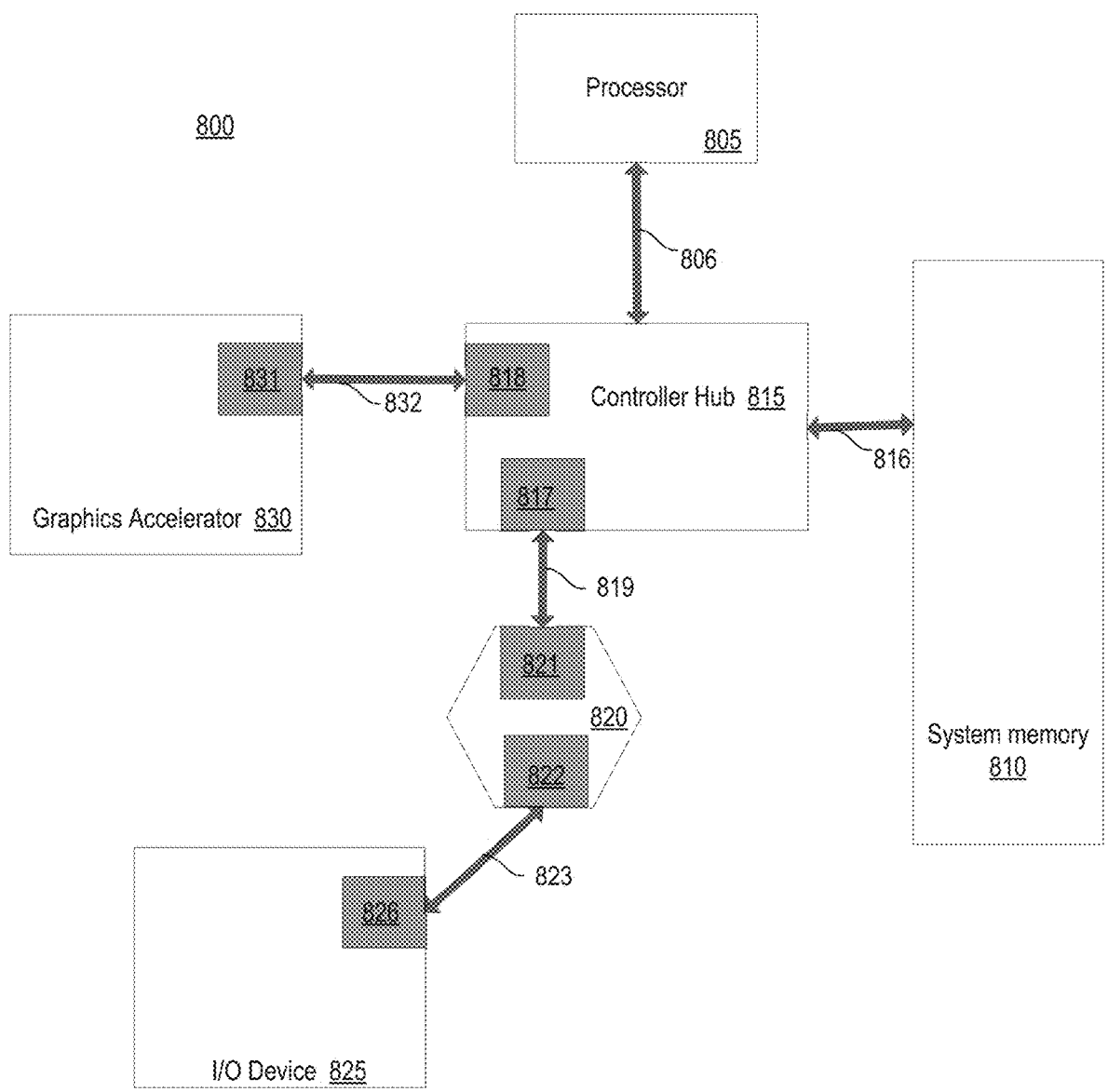
FIG. 8 is a block diagram of a computing system including an interconnect fabric architecture, according to an embodiment of the present disclosure.

FIG. 8 is a block diagram of a computing system including an interconnect fabric architecture, according to an embodiment of the present disclosure. Referring to FIG. 8, an embodiment of a fabric composed of point-to-point links that interconnect a set of components is illustrated. System 800 includes processor 805 and system memory 810 coupled to controller hub 815. Processor 805 includes any processing element, such as a microprocessor, a host processor, an embedded processor, a co-processor, or other processor. Processor 805 is coupled to controller hub 815 through front-side bus (FSB) 806. In one embodiment, FSB 806 is a serial point-to-point interconnect as described below. In another embodiment, link 806 includes a serial, differential interconnect architecture that is compliant with different interconnect standards.

System memory 810 includes any memory device, such as random access memory (RAM), non-volatile (NV) memory, or other memory accessible by devices in system 800. System memory 810 is coupled to controller hub 815 through memory interface 816. Examples of a memory interface include a double-data rate (DDR) memory interface, a dual-channel DDR memory interface, and a dynamic RAM (DRAM) memory interface.

In one embodiment, controller hub 815 is a root hub, root complex, or root controller in a PCIe® (or PCIE®) interconnection hierarchy, although can also exist within other point-to-point, serial, differential, layered protocol or interconnect fabric architectures by way of example. Examples of controller hub 815 include a chipset, a memory controller hub (MCH), a Northbridge, an interconnect controller hub (ICH) a Southbridge, and a root controller/hub. Often the term chipset refers to two physically separate controller hubs, i.e. a memory controller hub (MCH) coupled to an interconnect controller hub (ICH). Note that current systems often include the MCH integrated with processor 805, while controller hub 815 is to communicate with I/O devices, in a similar manner as described below. In some embodiments, peer-to-peer routing is optionally supported through root complex 815.

Here, controller hub 815 is coupled to switch/bridge 820 through serial link 819. Input/output modules 817 and 821, which can also be referred to as interfaces/ports 817 and 821, include/implement a layered protocol stack to provide communication between controller hub 815 and switch 820. In one embodiment, multiple devices are capable of being coupled to switch 820.

Switch/bridge 820 routes packets/messages from device 825 upstream, i.e. up a hierarchy towards a root complex, to controller hub 815 and downstream, i.e. down a hierarchy away from a root controller, from processor 805 or system memory 810 to device 825. Switch 820, in one embodiment, is referred to as a logical assembly of multiple virtual PCI-to-PCI bridge devices. Device 825 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a FireWire® device, a Universal Serial Bus (USB) device, a scanner, and other input/output devices. Often in the PCIe® vernacular, such a device is referred to as an endpoint. Although not specifically shown, device 825 can include a PCIe® to PCI/PCI-X bridge to support legacy or other version PCI™ devices. Endpoint devices in PCIe are often classified as legacy, PCIe®, or root complex integrated endpoints.

Graphics accelerator 830 is also coupled to controller hub 815 through serial link 832. In one embodiment, graphics accelerator 830 is coupled to an MCH, which is coupled to an ICH. Switch 820, and accordingly I/O device 825, is then coupled to the ICH. I/O modules 831 and 818 are also to implement a layered protocol stack to communicate between graphics accelerator 830 and controller hub 815. Similar to the MCH discussion above, a graphics controller or the graphics accelerator 830 itself can be integrated in processor 805.

Figure 9:
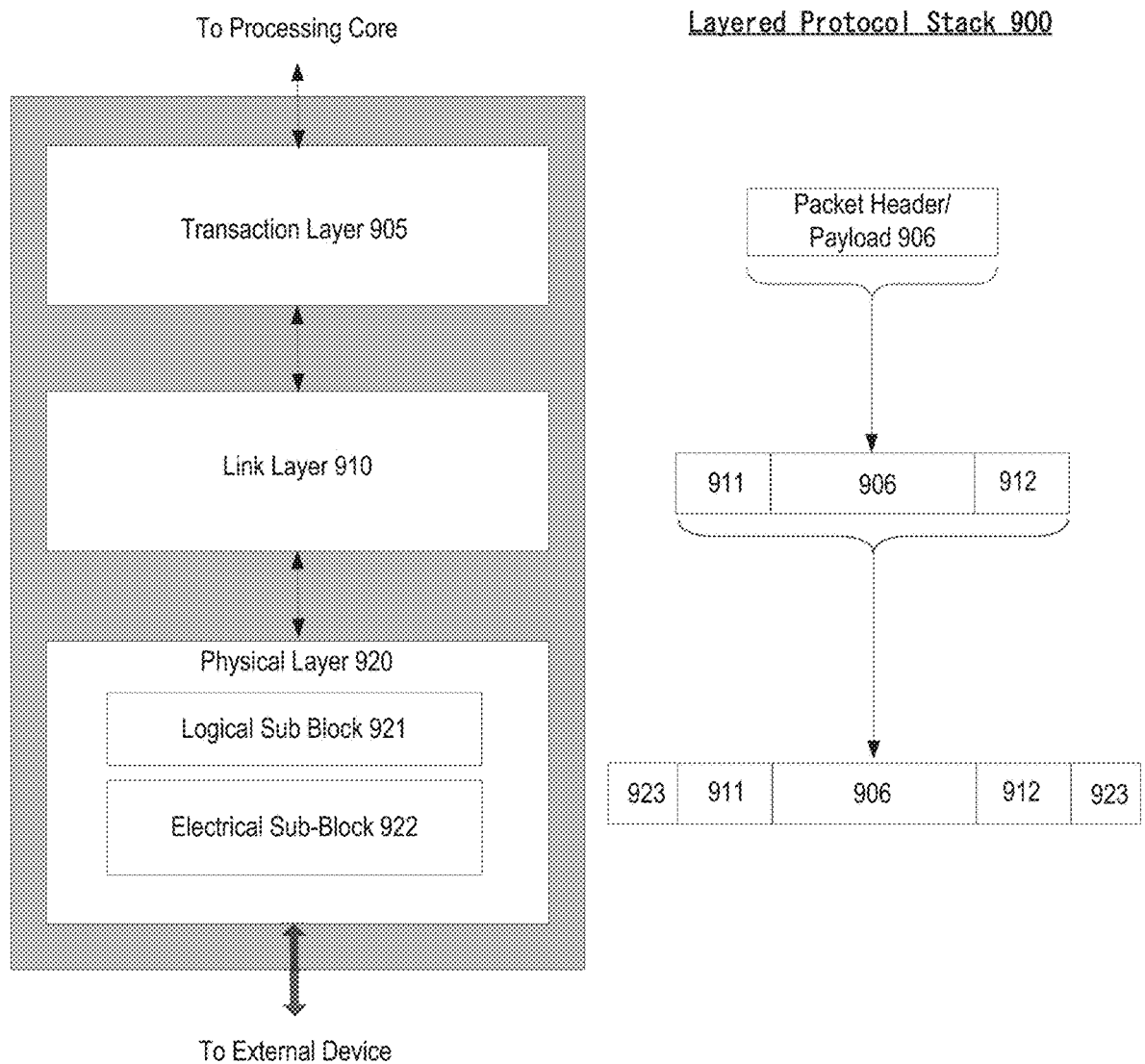
FIG. 9 is a block diagram of an interconnect fabric architecture including a layered stack, according to an embodiment of the present disclosure.
Figure 10:
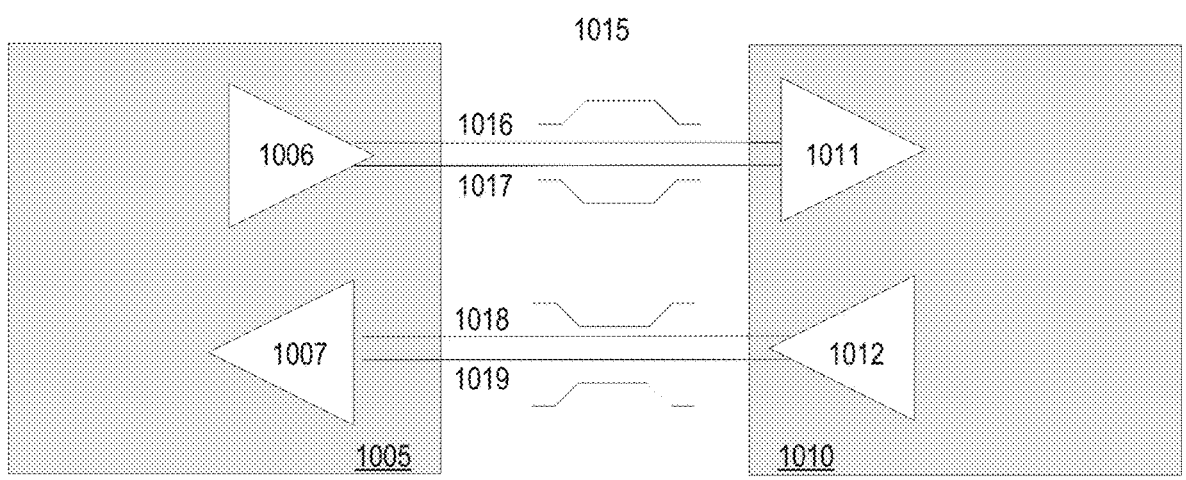
FIG. 10 is a block diagram of a transmitter and receiver pair usable within an interconnect fabric architecture or a serial point-to-point interconnect fabric, according to an embodiment of the present disclosure.

Turning to FIG. 9, an embodiment of a layered protocol stack is illustrated. Layered protocol stack 900 includes any form of a layered communication stack, such as a Quick Path Interconnect (QPI) stack, a PCIe® stack, a next generation high performance computing interconnect stack, or other layered stack. Although the discussion immediately below in reference to FIGS. 8-10 are in relation to a PCIe® stack, the same concepts can be applied to other interconnect stacks. In one embodiment, protocol stack 900 is a PCIe protocol stack including transaction layer 905, link layer 910, and physical layer 920. An interface, such as interfaces 817, 818, 821, 822, 826, and 831 in FIG. 8, can be represented as communication protocol stack 900. Representation as a communication protocol stack can also be referred to as a module or interface implementing/including a protocol stack.

In one embodiment, interfaces 817, 818, and 822 can be the source device 304 and include a driver circuit 306, which are discussed with reference to FIGS. 3A-7. Similarly, interfaces 821, 831, and 826 can be the sink device 314 and include a receiver circuit 312, which are also discussed with reference to FIGS. 3A-7. Accordingly, a group of data bits from one of interfaces 817, 818, or 822 can be distributed to one of the interfaces 821, 831, or 826, respectively, by the driver circuit 306 according to the DBI processing logic (or code) discussed herein, and be received by the receiver circuit 312 within the interface 821, 831, or 826.

PCI Express® uses packets to communicate information between components. Packets are formed in the transaction layer 905 and data link layer 910 to carry the information from the transmitting component to the receiving component. As the transmitted packets flow through the other layers, they are extended with additional information necessary to handle packets at those layers. At the receiving side the reverse process occurs and packets get transformed from their physical layer 920 representation to the data link layer 910 representation and finally (for transaction layer packets) to the form that can be processed by the transaction layer 905 of the receiving device.

Transaction Layer

In one embodiment, transaction layer 905 is to provide an interface between a device's processing core and the interconnect architecture, such as data link layer 910 and physical layer 920. In this regard, a primary responsibility of the transaction layer 905 is the assembly and disassembly of packets (e.g., transaction layer packets, or TLPs). The translation layer 905 typically manages credit-base flow control for TLPs. PCIe® implements split transactions, i.e. transactions with request and response separated by time, allowing a link to carry other traffic while the target device gathers data for the response.

In addition, PCIe® utilizes credit-based flow control. In this scheme, a device advertises an initial amount of credit for each of the receive buffers in transaction layer 905. An external device at the opposite end of the link, such as controller hub 815 in FIG. 8, counts the number of credits consumed by each TLP. A transaction can be transmitted if the transaction does not exceed a credit limit. Upon receiving a response, an amount of credit is restored. An advantage of a credit scheme is that the latency of credit return does not affect performance, provided that the credit limit is not encountered.

In one embodiment, four transaction address spaces include a configuration address space, a memory address space, an input/output (I/O) address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe® devices. Transactions to the configuration space include read requests and write requests. Message space transactions (or, simply messages) are defined to support in-band communication between PCIe® agents.

Therefore, in one embodiment, transaction layer 905 assembles packet header/payload 906. Format for current packet headers/payloads can be found in the PCIe® specification at the PCIe® specification website.

Link Layer

Link layer 910, also referred to as data link layer 910, acts as an intermediate stage between transaction layer 905 and the physical layer 920. In one embodiment, a responsibility of the data link layer 910 is providing a reliable mechanism for exchanging transaction layer packets (TLPs) between two components a link. One side of the data link layer 910 accepts TLPs assembled by the transaction layer 905, applies packet sequence identifier 911, e.g., an identification number or packet number, calculates and applies an error detection code, e.g., CRC 912, and submits the modified TLPs to the physical layer 920 for transmission across a physical to an external device.

Physical Layer

In one embodiment, physical layer 920 includes logical sub-block 921 and electrical sub-block 922 to physically transmit a packet to an external device. Here, logical sub-block 921 is responsible for the "digital" functions of physical layer 920. In this regard, the logical sub-block includes a transmit section to prepare outgoing information for transmission by electrical (e.g., physical) sub-block 922, and a receiver section to identify and prepare received information before passing it to the Link Layer 910.

In one embodiment, the electrical sub-block 922 includes a transmitter and/or a receiver, and can therefore include the driver circuit 306 (for transmission), the receiver circuit 3212 (for reception) or both (for both transmission and reception, respectively). In this way, DBI-based programming may be used to distribute the group of data bits from the physical layer 920 of a transmitting device (e.g., from driver circuit 306 the source device 304) to a physical layer 920 of a receiving device (e.g., to receiver circuit 162 of the sink device 314), as described in FIGS. 3A-7.

The transmitter can also, alternatively or additionally, be supplied by logical sub-block 921 with symbols, which the transmitter serializes and transmits onto to an external device. The receiver is supplied with serialized symbols from an external device and transforms the received signals into a bit-stream. The bit-stream is de-serialized and supplied to logical sub-block 921. In one embodiment, an 8b/10b transmission code is employed, where ten-bit symbols are transmitted/received. Here, special symbols can be used to frame a packet with frames 923. In addition, in one example, the receiver also provides a symbol clock recovered/reconstructed from the incoming serial stream.

As stated above, although transaction layer 905, link layer 910, and physical layer 920 are discussed in reference to a specific embodiment of a PCIe® protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

FIG. 10 is a block diagram of a transmitter and receiver pair 1000 usable within an interconnect fabric architecture and within a serial point-to-point fabric, according to an embodiment of the present disclosure. Although an embodiment of a PCIe® serial point-to-point link is illustrated, a serial point-to-point link is not so limited, as it includes any transmission path for transmitting serial data. In the embodiment shown, a basic PCIe® link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe® link.

In one embodiment, transmission logic 1006 and 1012 can each include driver circuit 306 such as displayed in and discussed with reference to FIGS. 3A-3B. Further, the receiving logic 1011 and 1007 can each include a receiver circuit 312 as displayed in and discussed with reference to FIGS. 3A-3B. In this way, the device 1005 can send a group of data bits within a stream of data bits to the device 1010 optionally with a DBI bit (if sending using DBI), as discussed with reference to FIGS. 3A-7. Similarly, the device 1010 can send a group of data bits to the device 1005 using DBI logic, as discussed with reference to FIGS. 3A-7.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In one embodiment, the transmission logic 1006 or 1012 can include or make up a part of the clock distribution circuit 112. Similarly, the receiving logic 1007 or 1011 can include or make up a part of the driver circuit 306.

A differential pair refers to two transmission paths, such as lines 1016 and 1017, to transmit differential signals. As an example, when line 1016 toggles from a low voltage level to a high voltage level, i.e. a rising edge, line 1017 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

Figure 11:
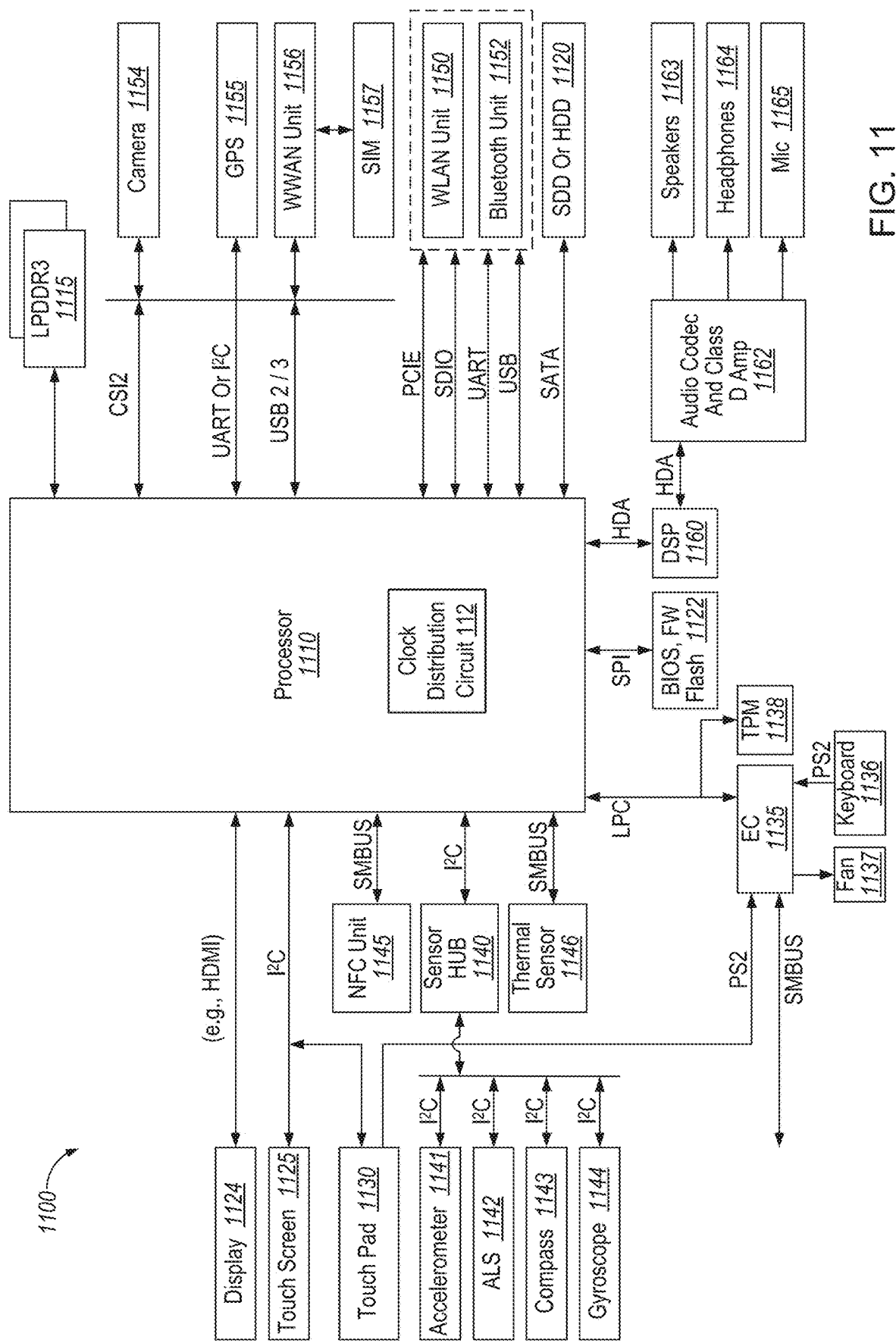
FIG. 11 is a block diagram of a computing system, according to an embodiment of the present disclosure.

Referring now to FIG. 11, a block diagram of components present in a computer system in accordance with an embodiment of the present disclosure is illustrated. As shown in FIG. 11, system 1100 includes any combination of components. These components can be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 11 is intended to show a high level view of many components of the computer system. However, it is to be understood that some of the components shown can be omitted, additional components can be present, and different arrangement of the components shown can occur in other implementations. As a result, the disclosure described above can be implemented in any portion of one or more of the interconnects illustrated or described below.

As seen in FIG. 11, a processor 1110, in one embodiment, includes a microprocessor, multi-core processor, multi-threaded processor, an ultra-low voltage processor, an embedded processor, or other known processing element. In one embodiment, the processor 1110 can include a clock distribution circuit 112 and the various connected I/O and connected devices (discussed below) can include a clock recovery circuit 162. In this way, the processor can act as a source device 104 for purposes of clock distribution as discussed herein, and the various connected I/O and other connected devices can act as a sink device 154 for purposes of recovering clock pulses, and reconstructing a clock employed by the processor 1110 for data communication.

In the illustrated implementation, processor 1110 acts as a main processing unit and central hub for communication with many of the various components of the system 1100. As one example, processor 1100 is implemented as a system on a chip (SoC). As a specific illustrative example, processor 1110 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters can instead be present in other embodiments such as an Apple A5/A6 processor, a Qualcomm Snapdragon processor, or TI OMAP processor. Note that many of the customer versions of such processors are modified and varied; however, they can support or recognize a specific instructions set that performs defined algorithms as set forth by the processor licensor. Here, the microarchitectural implementation can vary, but the architectural function of the processor is usually consistent. Certain details regarding the architecture and operation of processor 1110 in one implementation will be discussed further below to provide an illustrative example.

Processor 1110, in one embodiment, communicates with a system memory 1115. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices can be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And, other memory implementations are possible such as other types of memory modules, e.g., dual inline memory modules (DIMMs) of different varieties including but not limited to microDIMMs, Mini-DIMMs. In a particular illustrative embodiment, memory is sized between 2 GB and 16 GB, and can be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1120 can also couple to processor 1110. In various embodiments, to enable a thinner and lighter system design as well as to improve system responsiveness, this mass storage can be implemented via a solid state drive (SSD). However in other embodiments, the mass storage can primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 11, a flash device 1122 can be coupled to processor 1110, e.g., via a serial peripheral interface (SPI). This flash device can provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache can be configured as a single level cache (SLC) or multi-level cache (MLC) option to provide an appropriate level of responsiveness. In a SSD-only option, the module can be accommodated in various locations such as in a mSATA or NGFF slot. As an example, an SSD has a capacity ranging from 120 GB-1 TB.

Various input/output (I/O) devices can be present within system 1100. Specifically shown in the embodiment of FIG. 11 is a display 1124 which can be a high definition LCD or LED panel configured within a lid portion of the chassis. This display panel can also provide for a touch screen 1125, e.g., adapted externally over the display panel such that via a user's interaction with this touch screen, user inputs can be provided to the system to enable desired operations, e.g., with regard to the display of information, accessing of information and so forth. In one embodiment, display 1124 can be coupled to processor 1110 via a display interconnect that can be implemented as a high performance graphics interconnect. Touch screen 1125 can be coupled to processor 1110 via another interconnect, which in an embodiment can be an I²C interconnect. As further shown in FIG. 11, in addition to touch screen 1125, user input by way of touch can also occur via a touch pad 1130 which can be configured within the chassis and can also be coupled to the same I²C interconnect as touch screen 1125.

For perceptual computing and other purposes, various sensors can be present within the system and can be coupled to processor 1110 in different manners. Certain inertial and environmental sensors may couple to processor 1110 through a sensor hub 1140, e.g., via an I²C interconnect. In the embodiment shown in FIG. 11, these sensors can include an accelerometer 1141, an ambient light sensor (ALS) 1142, a compass 1143 and a gyroscope 1144. Other environmental sensors can include one or more thermal sensors 1146 which in some embodiments couple to processor 1110 via a system management bus (SMBus) bus.

Using the various inertial and environmental sensors present in a platform, many different use cases can be realized. These use cases enable advanced computing operations including perceptual computing and also allow for enhancements with regard to power management/battery life, security, and system responsiveness. For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it can be determined whether a user is allowed to access certain secure documents. For example, a user can be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations can include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing can be disabled. Furthermore, when pairing a platform as described herein and a smartphone, an alarm can be configured to be triggered when the devices move more than a predetermined distance from each other, when in a public location. In contrast, when these paired devices are in a safe location, e.g., a work place or home location, the devices can exceed this predetermined limit without triggering such alarm.

Responsiveness can also be enhanced using the sensor information. For example, even when a platform is in a low power state, the sensors can still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases can be enabled using sensor information obtained via the integrated sensors within a platform as described herein, and the above examples are only for purposes of illustration. Using a system as described herein, a perceptual computing system can allow for the addition of alternative input modalities, including gesture recognition, and enable the system to sense user operations and intent.

In various embodiments, the accelerometer can be a 3-axis accelerometer having data rates of at least 50 Hz. A gyroscope can also be included, which can be a 3-axis gyroscope. In addition, an e-compass/magnetometer can be present. Also, one or more proximity sensors can be provided (e.g., for lid open to sense when a person is in proximity (or not) to the system and adjust power/performance to extend battery life). For some OS's Sensor Fusion capability including the accelerometer, gyroscope, and compass can provide enhanced features. In addition, via a sensor hub having a real-time clock (RTC), a wake from sensors mechanism can be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS can be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can supports three power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 11, various peripheral devices may couple to processor 1110 via a low pin count (LPC) interconnect. In the embodiment shown, various components can be coupled through an embedded controller 1135. Such components can include a keyboard 1136 (e.g., coupled via a PS2 interface), a fan 1137, and a thermal sensor 1139. In some embodiments, touch pad 1130 can also couple to EC 1135 via a PS2 interface. In addition, a security processor such as a trusted platform module (TPM) 1138 in accordance with the Trusted Computing Group (TCG) TPM Specification Version 1.2, dated Oct. 2, 2003, can also couple to processor 1110 via this LPC interconnect. However, understand the scope of the present disclosure is not limited in this regard and secure processing and storage of secure information can be in another protected location such as a static random access memory (SRAM) in a security coprocessor, or as encrypted data blobs that are only decrypted when protected by a secure enclave (SE) processor mode.

In a particular implementation, peripheral ports can include a high definition media interface (HDMI™) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports can include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1100 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field can be via a near field communication (NFC) unit 1145 which can communicate, in one embodiment with processor 1110 via an SMBus. Note that via this NFC unit 1145, devices in close proximity to each other can communicate. For example, a user can enable system 1100 to communicate with another, e.g., portable device such as a smartphone of the user via adapting the two devices together in close relation and enabling transfer of information such as identification information payment information, data such as image data or so forth. Wireless power transfer can also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 11, additional wireless units can include other short range wireless engines including a WLAN unit 1150 and a Bluetooth unit 1152. Using WLAN unit 1150, Wi-Fi™ communications in accordance with a given Institute of Electrical and Electronics Engineers (IEEE) 802.11 standard can be realized, while via Bluetooth® unit 1152 (of Bluetooth Special Interest Group), short range communications via a Bluetooth® protocol can occur. These units may communicate with processor 1110 via, e.g., a USB link or a universal asynchronous receiver transmitter (UART) link. Or these units may couple to processor 1110 via an interconnect according to a Peripheral Component Interconnect Express® (PCIe®) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which can be configured on one or more add-in cards, can be by way of the Next Generation Form Factor (NGFF) connectors adapted to a motherboard.

In addition, wireless wide area communications, e.g., according to a cellular or other wireless wide area protocol (WWAN), can occur via a WWAN unit 1156 which in turn may couple to a subscriber identity module (SIM) 1157. In addition, to enable receipt and use of location information, a GPS module 1155 can also be present. Note that in the embodiment shown in FIG. 11, WWAN unit 1156 and an integrated capture device such as a camera module 1154 may communicate via any of a number of protocols. In one embodiment, the camera module 1154 communicates via a given USB protocol such as a USB 2.0 or 3.0 link, or a UART or I²C protocol. In another embodiment, the camera modules 1154 communicates via a Camera Serial Interface (CSI) such as CSI2. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows® 8 CS. This card can be configured in an internal slot (e.g., via an NGFF adapter). An additional module can provide for Bluetooth capability (e.g., Bluetooth® 4.0 with backwards compatibility) as well as Intel® Wireless Display functionality. In addition NFC support can be provided via a separate device or multi-function device, and can be positioned as an example, in a front right portion of the chassis for easy access. A still additional module can be a WWAN device that can provide support for 3G/4G/LTE and GPS. This module can be implemented in an internal (e.g., NGFF) slot. Integrated antenna support can be provided for WiFi™, Bluetooth®, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1160, which may couple to processor 1110 via a high definition audio (HDA) link. Similarly, DSP 1160 may communicate with an integrated coder/decoder (CODEC) and amplifier 1162 that in turn may couple to output speakers 1163 which can be implemented within the chassis. Similarly, amplifier and CODEC 1162 can be coupled to receive audio inputs from a microphone 1165 which in an embodiment can be implemented via dual array microphones (such as a digital microphone array) to provide for high quality audio inputs to enable voice-activated control of various operations within the system. Note also that audio outputs can be provided from amplifier/CODEC 1162 to a headphone jack 1164. Although shown with these particular components in the embodiment of FIG. 11, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1110 can be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR can be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1135. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 12:
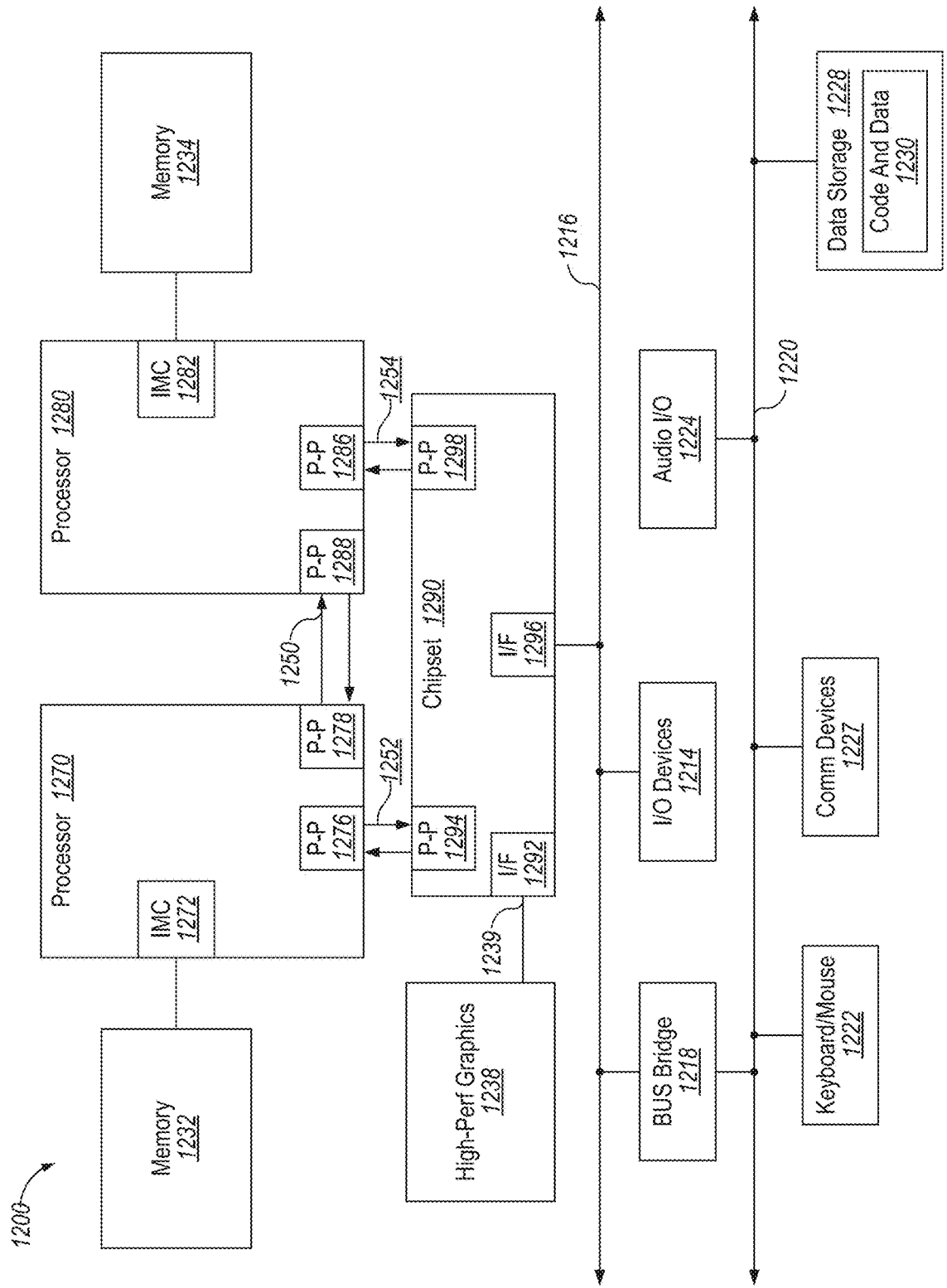
FIG. 12 is a block diagram of a computing system, according to another embodiment of the present disclosure.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 can be some version of a processor. In one embodiment, 1252 and 1254 are part of a serial, point-to-point coherent interconnect fabric, such as Intel's Quick Path Interconnect (QPI) architecture. As a result, the disclosure can be implemented within the QPI architecture.

While shown with only two processors 1270, 1280, it is to be understood that the scope of the present disclosure is not so limited. In other embodiments, one or more additional processors can be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 can exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which can be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239. In one embodiment, the interface circuit 1292 includes the clock distribution circuit 112, and the high performance graphics circuit 1238 includes the clock recovery circuit 162. Accordingly, the interface circuit 1292 can distribute a clock distribution pattern and distribute a clock signal to the high performance graphics circuit 1238 according to the clock distribution pattern as discussed with reference to FIG. 1-7.

A shared cache (not shown) can be included in either processor or outside of both processors; yet connected with the processors via P-P interconnect, such that either or both processors' local cache information can be stored in the shared cache if a processor is placed into a low power mode.

Chipset 1290 can be coupled to a first bus 1216 via an interface 1296. In one embodiment, first bus 1216 can be a Peripheral Component Interconnect (PCI) bus, or a bus such as a PCI Express® bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system can implement a multi-drop bus or other such architecture.

In one embodiment, the interface 1296 includes one or more of clock distribution circuit 112 and any of the connected devices (off of first bus 1216 or the second bus 1220) includes the driver circuit 306, according to the present disclosure. Accordingly, the interface circuit 1296 can send a group of data bits to any of the connected devices according to the DBI logic as discussed with reference to FIGS. 3A-7.

The following examples pertain to further embodiments.

Example 1 is a device comprising: 1) a driver circuit to send data bits onto a data bus that is partitioned into a direct-current (DC) component and an alternating-current (AC) component, the driver circuit to, for a group of data bits: a) retrieve a value of a DC power ratio of the data bus; b) determine, using the value of the DC power ratio, a first value for a first portion of total power to be dissipated over the DC component to transmit the group of data bits; c) determine, using one minus the value of the DC power ratio, a second value for a second portion of total power to be dissipated over the AC component to transmit the group of data bits; and d) determine whether to send the group of data bits onto the data bus using data bus inversion (DBI) dependent on a combination of the first value and the second value.

In Example 2, the device of Example 1, wherein, in response to deciding to send the group of data bits using DBI, the driver circuit is further to: a) invert each bit of the group of data bits; and b) send, along with the inverted bits, a DBI bit to indicate use of data bus inversion.

In Example 3, the device of Example 1, wherein, in response to not deciding to send the group of data bits using DBI, the driver circuit is further to send the group of data bits without sending a DBI bit.

In Example 4, the device of Example 1, wherein to determine whether to send the group of data bits using DBI further comprises: a) determine, from a first combination of the first value and the second value, a first total power to be dissipated without DBI; b) determine, from a second combination of the first value and the second value, a second total power to be dissipated with DBI; and c) send the group of data bits using DBI in response to the first total power being greater than the second total power.

In Example 5, the device of Example 4, wherein to determine the second combination, the driver circuit is first to determine the first value and the second value with an assumption that the group of data bits is inverted.

In Example 6, the device of Example 1, wherein to retrieve the value of the DC power ratio of the data bus is to retrieve the value of the DC power ratio from memory stored by a basic input/output system during power management programming.

In Example 7, the device of Example 1, wherein the value of the DC power ratio is a discrete quantized value comprising between two and four bits.

Various embodiments can have different combinations of the structural features described above. For instance, all optional features of the computing system described above can also be implemented with respect to the method or process described herein and specifics in the examples can be used anywhere in one or more embodiments.

Example 8 is a method comprising: a) retrieving, by a driver circuit coupled to a data bus that includes a direct-current (DC) component and an alternating-current (AC) component, a value of a DC power ratio of the data bus; b) determining, with the driver circuit using the value of the DC power ratio, a first value for a first portion of total power to be dissipated over the DC component to transmit a group of data bits; c) determining, with the driver circuit using one minus the value of the DC power ratio, a second value for a second portion of total power to be dissipated over the AC component to transmit the group of data bits; and d) determining, with the driver circuit, whether to send the group of data bits onto the data bus using data bus inversion (DBI) depending on a combination of the first value and the second value.

In Example 9, the method of Example 8, wherein, in response to deciding to send the group of data bits using DBI, further comprising: a) inverting, with the driver circuit, each bit of the group of data bits; and b) sending, with the driver circuit along with the inverted data bits, a DBI bit to indicate use of data bus inversion.

In Example 10, the method of Example 8, wherein, in response to not deciding to send the group of data bits using DBI, the driver circuit sending the group of data bits without sending a DBI bit.

In Example 11, the method of Example 8, wherein determining whether to send the group of data bits using DBI further comprises: a) determining, from a first combination of the first value and the second value, a first total power to be dissipated without DBI; b) determining, from a second combination of the first value and the second value, a second total power to be dissipated with DBI; and c) sending the group of data bits using DBI in response to the first total power being greater than the second total power.

In Example 12, the method of Example 11, further comprising determining the second combination by first determining the first value and the second value with an assumption that the group of data bits is inverted.

In Example 13, the method of Example 8, wherein retrieving the value of the DC power ratio of the data bus comprises retrieving the value of the DC power ratio from memory programmed by a basic input/output system during power management programming.

In Example 14, the method of Example 8, wherein the value of the DC power ratio is a discrete quantized value comprising between two and four bits.

Various embodiments can have different combinations of the structural features described above. For instance, all optional features of the computing system described above can also be implemented with respect to the method or process described herein and specifics in the examples can be used anywhere in one or more embodiments.

Example 15 is a system comprising: 1) a memory to store a value of a direct-current (DC) power ratio; 2) a data bus comprising a DC component and an alternating-current (AC) component; and 3) a driver circuit coupled to the memory and the data bus, the driver circuit to send data bits onto the data bus and to, for a group of data bits: a) retrieve, from the memory, the value of the DC power ratio of the data bus; b) determine, using the value of the DC power ratio, a first value for a first portion of total power to be dissipated over the DC component to transmit the group of data bits; c) determine, using one minus the value of the DC power ratio, a second value for a second portion of total power to be dissipated over the AC component to transmit the group of data bits; and d) determine whether to send the group of data bits onto the data bus using data bus inversion (DBI) dependent on a combination of the first value and the second value.

In Example 16, the system of Example 15, wherein, in response to deciding to send the group of data bits using DBI, the driver circuit is further to: a) invert each bit of the group of data bits; and b) send, in parallel with the inverted bits, a DBI bit to indicate use of data bus inversion.

In Example 17, the system of Example 15, wherein, in response to not deciding to send the group of data bits using DBI, the driver circuit is further to send the group of data bits without sending a DBI bit.

In Example 18, the system of Example 15, wherein to determine whether to send the group of data bits using DBI further comprises: a) determine, from a first combination of the first value and the second value, a first total power to be dissipated without DBI; b) determine, from a second combination of the first value and the second value, a second total power to be dissipated with DBI; and c) send the group of data bits using DBI in response to the first total power being greater than the second total power.

In Example 19, the system of Example 18, wherein to determine the second combination, the driver circuit is first to determine the first value and the second value with an assumption that the group of data bits is inverted.

In Example 20, the system of Example 15, further comprising a processing device coupled to the memory, the processing device to execute a basic input/output system firmware to program, during power management programming, the value of the DC power ratio to the memory.

In Example 21, the system of Example 15, wherein the value of the DC power ratio is a discrete quantized value comprising between two and four bits.

In Example 22, the system of Example 15, wherein the data bus is a double data rate (DDR) bus coupled to a DDR dynamic random access memory (DRAM) module.

In Example 23, the system of Example 15, wherein the data bus is coupled to a memory module based on one of NAND flash, 3D crosspoint, and phase change memory (PCM).

Various embodiments can have different combinations of the structural features described above. For instance, all optional features of the computing system described above can also be implemented with respect to the method or process described herein and specifics in the examples can be used anywhere in one or more embodiments.

Example 24 is a non-transitory computer-readable storage medium comprising instructions, that when executed by a processing device, executes a plurality of operations comprising: a) retrieving, by a driver circuit coupled to a data bus that includes a direct-current (DC) component and an alternating-current (AC) component, a value of a DC power ratio of the data bus; b) determining, with the driver circuit using the value of the DC power ratio, a first value for a first portion of total power to be dissipated over the DC component to transmit a group of data bits; c) determining, with the driver circuit using one minus the value of the DC power ratio, a second value for a second portion of total power to be dissipated over the AC component to transmit the group of data bits; and d) determining, with the driver circuit, whether to send the group of data bits onto the data bus using data bus inversion (DBI) depending on a combination of the first value and the second value.

In Example 25, the non-transitory computer-readable storage medium of Example 24, wherein, in response to deciding to send the group of data bits using DBI, the plurality of operations further comprising: a) inverting, with the driver circuit, each bit of the group of data bits; and b) sending, with the driver circuit along with the inverted data bits, a DBI bit to indicate use of data bus inversion.

In Example 26, the non-transitory computer-readable storage medium of Example 24, wherein, in response to not deciding to send the group of data bits using DBI, the plurality of operations comprising sending the group of data bits without sending a DBI bit.

In Example 27, the non-transitory computer-readable storage medium of Example 24, wherein determining whether to send the group of data bits using DBI further comprises: a) determining, from a first combination of the first value and the second value, a first total power to be dissipated without DBI; b) determining, from a second combination of the first value and the second value, a second total power to be dissipated with DBI; and c) sending the group of data bits using DBI in response to the first total power being greater than the second total power.

In Example 28, the non-transitory computer-readable storage medium of Example 27, wherein the plurality of operations further comprises determining the second combination by first determining the first value and the second value with an assumption that the group of data bits is inverted.

In Example 29, the non-transitory computer-readable storage medium of Example 24, wherein retrieving the value of the DC power ratio of the data bus comprises retrieving the value of the DC power ratio from memory programmed by a basic input/output system during power management programming.

In Example 30, the non-transitory computer-readable storage medium of Example 24, wherein the value of the DC power ratio is a discrete quantized value comprising between two and four bits.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to compression/decompression optimization in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A device comprising:
a driver circuit to send data bits onto a data bus that is partitioned into a direct-current (DC) component and an alternating-current (AC) component, the driver circuit to, for a group of data bits:
retrieve a value of a DC power ratio of the data bus;
determine, using the value of the DC power ratio, a first value for a first portion of total power to be dissipated over the DC component to transmit the group of data bits;
determine, using one minus the value of the DC power ratio, a second value for a second portion of total power to be dissipated over the AC component to transmit the group of data bits;
determine whether to send the group of data bits onto the data bus using data bus inversion (DBI) dependent on a combination of the first value and the second value; and
in response to deciding to send the group of data bits using DBI,
invert each bit of the group of data bits; and
send, along with the inverted bits, a DBI bit to indicate use of data bus inversion.

2. The device of claim 1, wherein, in response to not deciding to send the group of data bits using DBI, the driver circuit is further to send the group of data bits without sending a DBI bit.

3. The device of claim 1, wherein to determine whether to send the group of data bits using DBI further comprises:
determine, from a first combination of the first value and the second value, a first total power to be dissipated without DBI;
determine, from a second combination of the first value and the second value, a second total power to be dissipated with DBI; and
send the group of data bits using DBI in response to the first total power being greater than the second total power.

4. The device of claim 3, wherein to determine the second combination, the driver circuit is first to determine the first value and the second value with an assumption that the group of data bits is inverted.

5. The device of claim 1, wherein to retrieve the value of the DC power ratio of the data bus is to retrieve the value of the DC power ratio from memory stored by a basic input/output system during power management programming.

6. The device of claim 1, wherein the value of the DC power ratio is a discrete quantized value comprising between two and four bits.

7. A method comprising:
retrieving, by a driver circuit coupled to a data bus that includes a direct-current (DC) component and an alternating-current (AC) component, a value of a DC power ratio of the data bus;
determining, with the driver circuit using the value of the DC power ratio, a first value for a first portion of total power to be dissipated over the DC component to transmit a group of data bits;
determining, with the driver circuit using one minus the value of the DC power ratio, a second value for a second portion of total power to be dissipated over the AC component to transmit the group of data bits;
determining, with the driver circuit, whether to send the group of data bits onto the data bus using data bus inversion (DBI) depending on a combination of the first value and the second value; and
in response to deciding to send the group of data bits using DBI,
inverting, with the driver circuit, each bit of the group of data bits; and
sending, with the driver circuit along with the inverted data bits, a DBI bit to indicate use of data bus inversion.

8. The method of claim 7, wherein, in response to not deciding to send the group of data bits using DBI, the driver circuit sending the group of data bits without sending a DBI bit.

9. The method of claim 7, wherein determining whether to send the group of data bits using DBI further comprises:
determining, from a first combination of the first value and the second value, a first total power to be dissipated without DBI;
determining, from a second combination of the first value and the second value, a second total power to be dissipated with DBI; and
sending the group of data bits using DBI in response to the first total power being greater than the second total power.

10. The method of claim 9, further comprising determining the second combination by first determining the first value and the second value with an assumption that the group of data bits is inverted.

11. The method of claim 7, wherein retrieving the value of the DC power ratio of the data bus comprises retrieving the value of the DC power ratio from memory programmed by a basic input/output system during power management programming.

12. The method of claim 7, wherein the value of the DC power ratio is a discrete quantized value comprising between two and four bits.

13. A system comprising:
a memory to store a value of a direct-current (DC) power ratio;
a data bus comprising a DC component and an alternating-current (AC) component; and
a driver circuit coupled to the memory and the data bus, the driver circuit to send data bits onto the data bus and to, for a group of data bits:
retrieve, from the memory, the value of the DC power ratio of the data bus;
determine, using the value of the DC power ratio, a first value for a first portion of total power to be dissipated over the DC component to transmit the group of data bits;
determine, using one minus the value of the DC power ratio, a second value for a second portion of total power to be dissipated over the AC component to transmit the group of data bits;
determine whether to send the group of data bits onto the data bus using data bus inversion (DBI) dependent on a combination of the first value and the second value; and in response to deciding to send the group of data bits using DBI,
  invert each bit of the group of data bits; and
  send, in parallel with the inverted bits, a DBI bit to indicate use of data bus inversion.

14. The system of claim 13, wherein, in response to not deciding to send the group of data bits using DBI, the driver circuit is further to send the group of data bits without sending a DBI bit.

15. The system of claim 13, wherein to determine whether to send the group of data bits using DBI further comprises:
  determine, from a first combination of the first value and the second value, a first total power to be dissipated without DBI;
  determine, from a second combination of the first value and the second value, a second total power to be dissipated with DBI; and
  send the group of data bits using DBI in response to the first total power being greater than the second total power.

16. The system of claim 15, wherein to determine the second combination, the driver circuit is first to determine the first value and the second value with an assumption that the group of data bits is inverted.

17. The system of claim 13, further comprising a processing device coupled to the memory, the processing device to execute a basic input/output system firmware to program, during power management programming, the value of the DC power ratio to the memory.

18. The system of claim 13, wherein the value of the DC power ratio is a discrete quantized value comprising between two and four bits.

19. The system of claim 13, wherein the data bus is a double data rate (DDR) bus coupled to a DDR dynamic random access memory (DRAM) module.

20. The system of claim 13, wherein the data bus is coupled to a memory module based on one of NAND flash, 3D crosspoint, and phase change memory (PCM).

* * * * *